United States Patent [19]

Kinmartin et al.

[11] Patent Number: 5,101,883
[45] Date of Patent: Apr. 7, 1992

[54] METHOD OF ASSEMBLY OF SINGLE AND MULTI-ZONE VEHICLE HEATING AND A/C SYSTEMS

[75] Inventors: Jeffrey C. Kinmartin, East Amherst; Frank C. Falzone, Cheektowaga; Donald E. Hoffman, Java Center, all of N.Y.

[73] Assignee: General Motors Corporation, Detroit, Mich.

[21] Appl. No.: 722,766

[22] Filed: Jun. 27, 1991

[51] Int. Cl.⁵ .................................... F24F 3/044
[52] U.S. Cl. ............................... 165/1; 165/22; 165/42; 165/43; 165/76; 165/137; 237/12.3 A; 237/12.3 B; 454/160
[58] Field of Search .............. 165/16, 22, 42, 43, 165/1, 137, 76; 237/12.3 A, 12.3 B; 98/2.11

[56] References Cited

U.S. PATENT DOCUMENTS

| 4,534,507 | 8/1985 | Matsuda | 237/12.3 |
| 4,549,692 | 10/1985 | Busch et al. | 237/12.3 |
| 4,582,252 | 4/1986 | Ogihara et al. | 237/12.3 A |
| 4,584,846 | 4/1986 | Uchida | 62/244 |
| 4,802,405 | 2/1989 | Ichitani et al. | 98/2.06 |
| 4,852,639 | 8/1989 | Horiguche et al. | 165/42 |
| 4,898,325 | 2/1990 | Sakurada | 98/2.11 |
| 4,901,788 | 2/1990 | Doi | 165/24 |
| 4,940,083 | 7/1990 | Takenaka et al. | 165/22 |
| 5,016,704 | 5/1991 | Ono | 165/43 |

FOREIGN PATENT DOCUMENTS

| 0063510 | 4/1983 | Japan | 165/22 |
| 0122213 | 7/1983 | Japan | 165/43 |
| 0188213 | 8/1986 | Japan | 237/12.3 A |
| 0263822 | 11/1986 | Japan | 237/12.3 A |
| 0305018 | 12/1988 | Japan | 165/43 |
| 0063414 | 3/1989 | Japan | 98/2.11 |

*Primary Examiner*—John K. Ford
*Attorney, Agent, or Firm*—Ronald L. Phillips

[57] ABSTRACT

A vehicle heating and cooling system has a distribution duct separated into two channels by a baffle for supplying separate air streams to the passenger and driver sides of the vehicle compartment. Two temperature control doors associated with the heater core and evaporator separately admit an air mix to the two channels for independent control of driver and passenger side temperature. Optionally a single door is used in place of the two temperature control doors so that at the time of manufacture the system can be configured as a single zone system. A rear air discharge opening is provided in one of the channels to supply a duct leading to the rear seat region of the vehicle compartment.

5 Claims, 3 Drawing Sheets

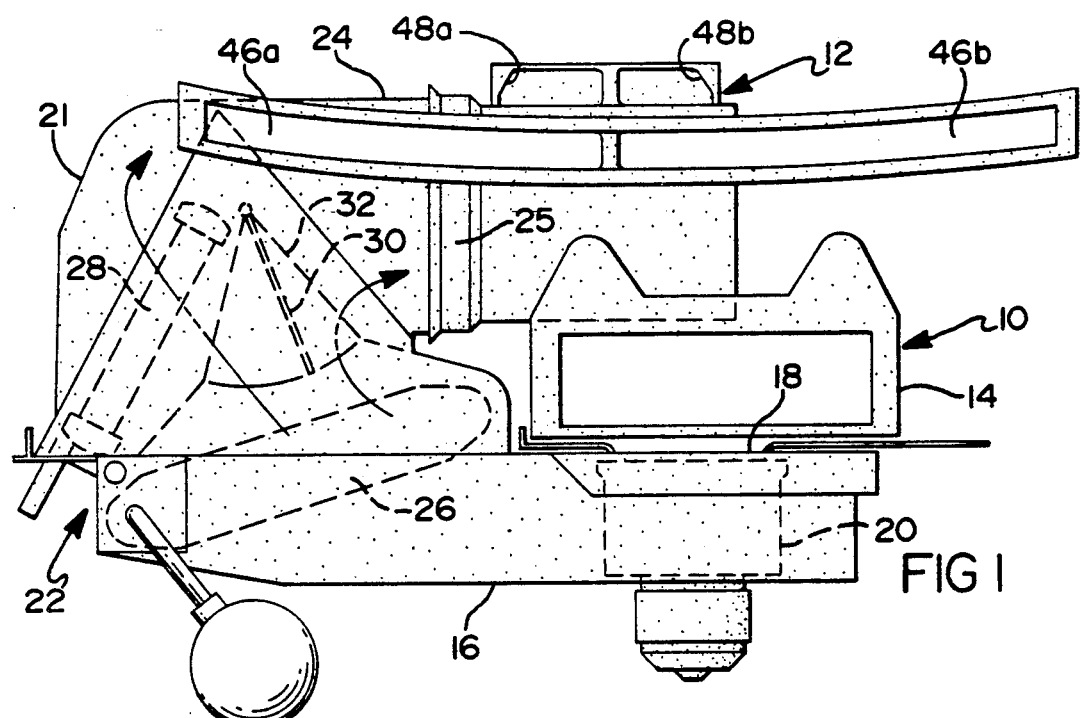
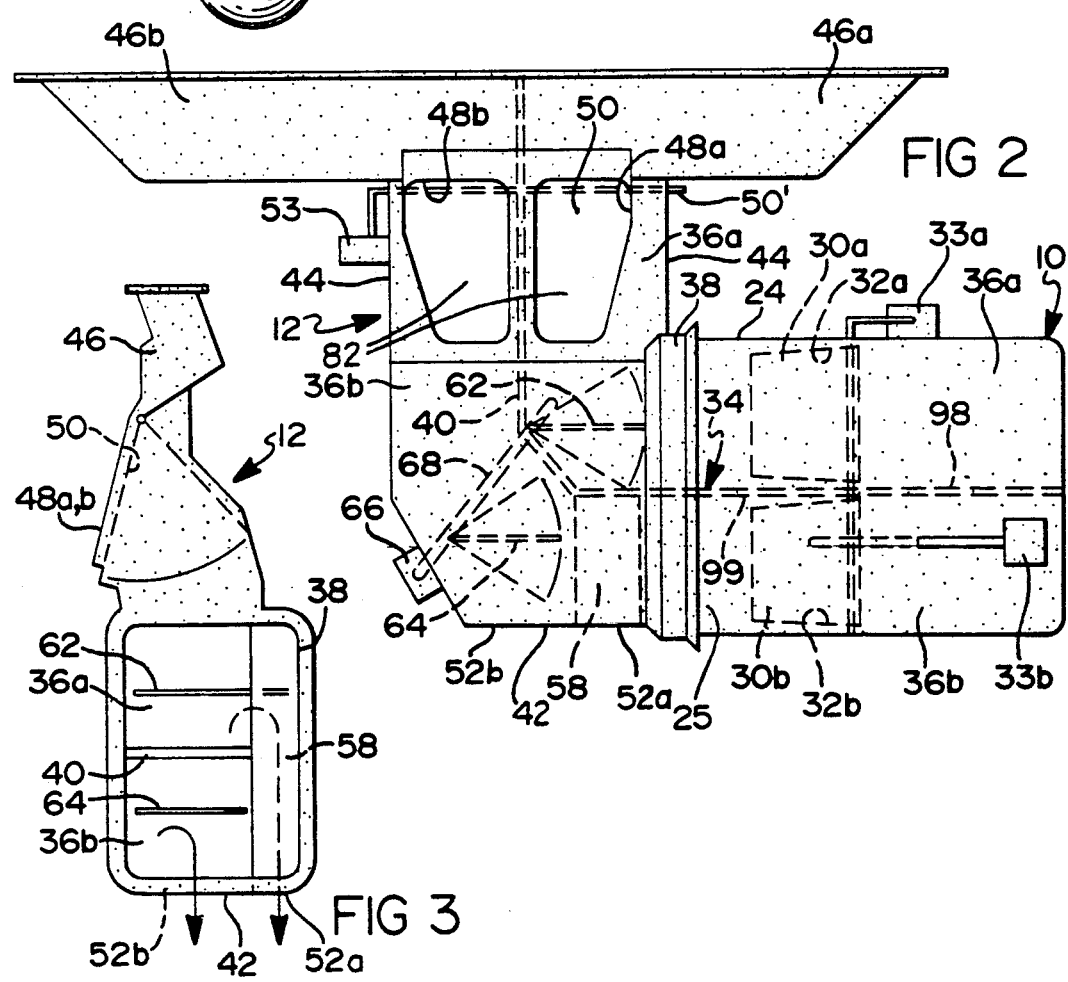

METHOD OF ASSEMBLY OF SINGLE AND MULTI-ZONE VEHICLE HEATING AND A/C SYSTEMS

FIELD OF THE INVENTION

This invention relates to heating and air conditioning systems and particularly to such a system which can be manufactured as either a single zone or multi-zone system.

BACKGROUND OF THE INVENTION

In an automotive vehicle limited space is allotted beneath or in front of the instrument panel for the heating and air conditioning system In vehicles which have single zone systems compactly designed to fit within the allotted space it is sometimes desirable to provide a dual zone system. A dual zone system allows the driver and the passenger to have separate control of the temperature to maximize the comfort of each individual. Extending the zone system further, a separate control or controls for the rear seat region may also be desirable.

Single zone systems are generally designed to optimally utilize the amount of available space in a given type of vehicle as well as to conform to the shape of the space. When a dual zone system is designed, it generally must conform to the same size and shape, thereby requiring an additional function to be added without extra room to add it. Moreover, when a dual zone system is provided for a vehicle, is often desired to offer to customers a less expensive single zone system as well. The expense of tooling for wholly different systems can be prohibitive, however.

SUMMARY OF THE INVENTION

It is therefore an object of the invention to provide a dual zone or multi-zone heating and cooling system which fits the same space and configuration as a single zone system. It is another object of the invention to provide a single assembly which can for the most part be used for either single or multi-zone.

The invention is carried out by a system for vehicle heating and air conditioning adapted to single and multiple zones comprising an outlet duct including a plurality of air outlets; an intake duct for supplying an air flow to the outlet duct; heat exchanger means in the intake duct for selectively heating and cooling the air flow to the outlet duct; baffle means in the outlet duct for dividing the outlet duct into a plurality of channels, each channel for carrying a portion of the air flow to at least one outlet; and door means in the intake duct cooperatively arranged with the heat exchanger means for controlling the temperature of the air flow entering the channels, whereby the temperature of air from each outlet is determined by positioning the door means.

The invention further contemplates that the door means can be a single door for like control of both channels or two independently controlled doors for separate control of each channel.

BRIEF DESCRIPTION OF THE DRAWINGS

The above and other advantages of the invention will become more apparent from the following description taken in conjunction with the accompanying drawings wherein like references refer to like parts and wherein:

FIGS. 1, 2, and 3 are schematic plan, rear and side views, respectively, of a heating and cooling system according to the invention;

DESCRIPTION OF THE INVENTION

Figure 4:
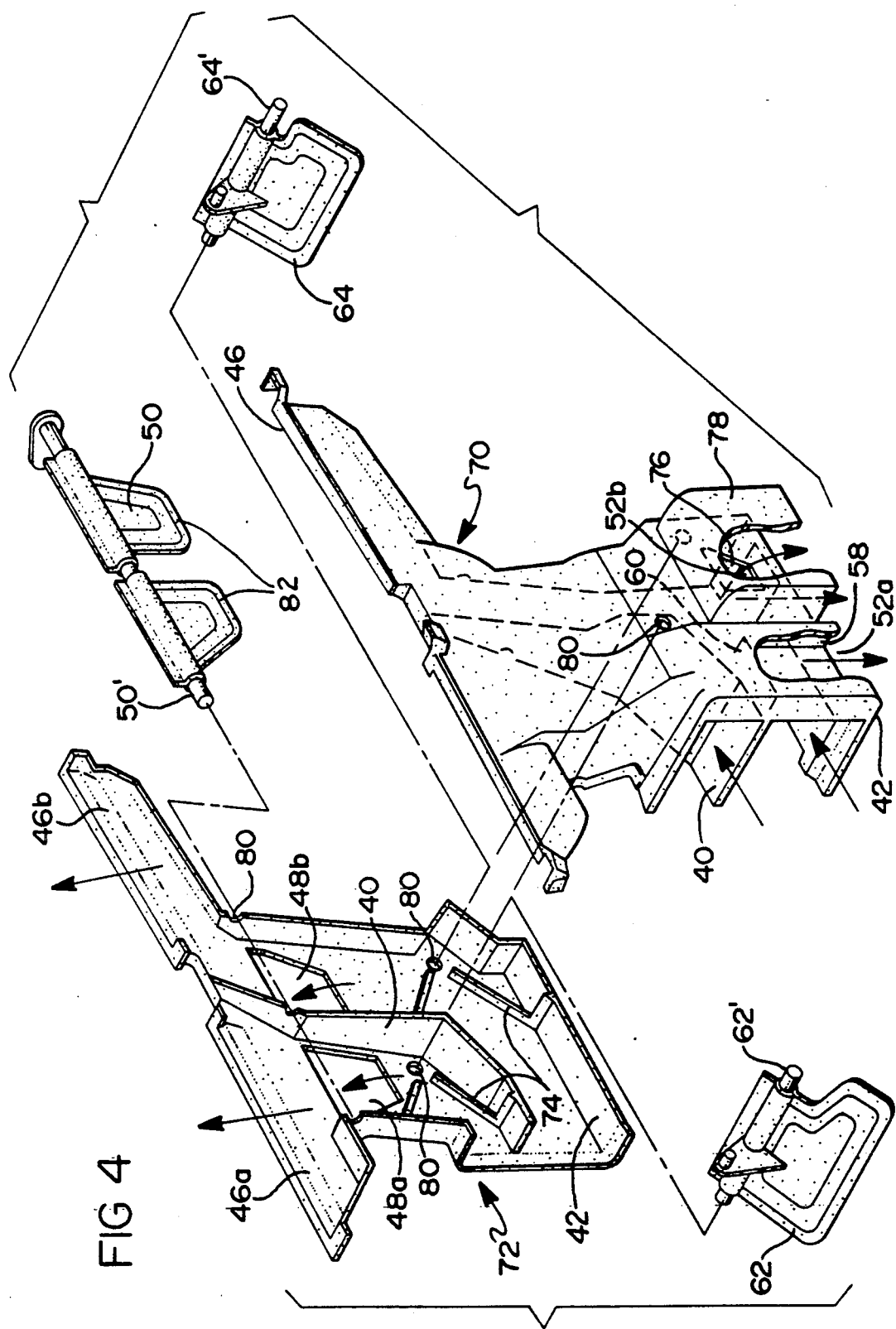
FIG. 4 is an exploded view of the duct module of the system according to the invention.

This description is directed to a vehicular heating and cooling system which adaptable to either a single zone system or a dual zone system at the time of manufacture by selecting either a single temperature control door or valve and associated actuator or a pair of temperature control doors or valves each with an associated actuator, the latter being independently controlled to afford different temperatures at different zones. In particular, the zones are defined as the driver side and the passenger side of the vehicle compartment. Both the single zone system and the dual zone system have the same duct arrangement and thus separately supply air to each zone but, due to the single temperature door, the single zone is unable to provide different zone temperatures.

Referring to FIGS. 1, 2 and 3, the heating and cooling system comprises a heater, evaporator and blower assembly 10 for producing two streams of temperature controlled air, coupled to a modular duct assembly 12 for distributing the air streams to discharge outlets which serve the driver side and the passenger side of the vehicle compartment. Provision is also made for part of one of the streams to be directed to the rear of the vehicle compartment for the comfort of rear seat occupants.

The assembly 10 includes an air inlet housing 14, a blower housing 16 joined to the air inlet housing 14 through an opening 18, a blower 20 having its axis aligned with the opening 18 for drawing in air and blowing an air stream through the blower housing 16, a heat exchanger system 22 at an end of the blower housing 16 and enclosed by a heater cover 21, and an outlet housing 24 adjacent the blower housing and having one end coupled with the heat exchanger system 22 so that the air stream flows in a U-shaped path with the stream in the outlet housing 24 flowing anti-parallel to the stream in the blower housing 16. The heat exchanger system includes an air conditioner evaporator 26 in the path of the stream so that all of the air flows through the evaporator, a heater core 28 positioned in the bottom of the U-shaped path so that air may flow through the heater core, and temperature control door or doors 30 arranged in a space between the evaporator 26 and the heater core 28 to selectively permit all or a portion of the air stream to pass directly from the evaporator 26 to the outlet housing 24, thereby bypassing the heater core. Two door openings 32a, 32b define the bypass area and are closed by dual doors 30a and 30b for a dual zone system or by a single door 30 for a single zone system. The doors pivot about a vertical axis. As shown in FIGS. 2 and 3, an actuator 33a controls the door 30a and an actuator 33b controls the door 30b. It should be understood that the actuators 33a and 33b may be incorporated into a single actuator assembly having dual outputs. Where only a single door 30 is used, only the actuator 33a is needed. A baffle 34 extends downstream from the limit positions of the doors 30 to the mouth 25 of the housing to define two channels 36a, 36b which divide the air stream into two streams. The outlet housing 24 directs the air flow horizontally and the baffle 34 lies in a horizontal plane so that the channel 36a lies directly above the channel 36b.

The duct assembly 12 has a mouth 38 which sealingly engages the outlet housing mouth 25 and has a baffle 40 which divides the duct assembly into two portions. Effectively, the baffle 40 serves as an extension of the baffle 34 so that the two channels 36a, 36b continue through the duct assembly. While the duct lower surface 42 and the baffle 40 are horizontal at the mouth 38 to continue the horizontal aspect of the channels, the baffle 40 changes a short distance inside the mouth 38 into a vertical direction and lies between vertical walls 44 of the duct assembly to further continue the channels 36a, 36b.

The two channels 36a, 36b terminate at the upper end of the assembly 12 in elongated defogger discharge vents 46a and 46b. Just below the defogger vents 46a and 46b, upper level discharge vents 48a and 48b are provided in a rear wall of each channel 36a, 36b. The two vents 48a and 48b are closed by a single upper mode door 50 having a hinge pin 50, which pivots about a horizontal axis above the vents 48a and 48b and extending transverse of the vehicle An actuator 53 is operably connected to the hinge pin 50' to actuate the door. The door 50, when in closed or right hand position as shown in FIG. 3 blocks air flow through the vents 48a and 48b and allows flow to the defogger vents 46a and 46b. On the other hand, when the door is in open or left hand position, the airflow is directed through the vents 48a and 48b and the defogger is blocked. A lower level discharge vent 52b communicating with the channel 32b is formed in the lower surface 42 of the duct assembly 12 for low level heating of one side of the vehicle A second lower level discharge vent 52a communicating with the upper channel 32a is provided by a vertical passage 58 formed in the wall of the duct assembly and extending from an opening 60 in the horizontal portion of the baffle 40 to the lower surface 42 of the assembly, thereby passing along the front side of the lower channel 32b. Two lower mode doors 62 and 64 are positioned in the respective channels 36a, 36b near the mouth 38 to control passage of air through the channels and through the lower level vents 52a and 52b. The doors 62 and 64 are coupled to a common actuator 66 by a link 68 and are moved together by the actuator. The doors 62 and 64 move from a neutral position which allows air flow through the channels to the upper level and defogger vents as well as through the lower vents to extreme positions which block air flow to either the upper or the lower vents. The door 62 has a lateral wing which protrudes into the vertical passage 58 to selectively cover the opening 60. The doors 62 and 64 pivot on horizontal axes extending parallel to the vehicle longitudinal axis.

FIG. 4 is an exploded view of the modular duct assembly 12. The assembly includes two molded polymer housing sections comprising a front section 70 and a rear section 72, each of which includes part of the baffle 40 and opposite sides of the defogger vents 46a and 46b as well as the necessary side walls and bottom surface 42. Seats 74 for the doors 62 and 64 are molded into the side walls and baffle to provide for door closure when moved to closed position The upper level vent 48a and 48b apertures are formed in a side wall of section 72 while the lower vent apertures 52a and 52b are formed in the bottom surface 42 of section 70. The passage 58 is also molded into the front section 70. This figure also shows an opening 76 in the front wall of the front section 70 to provide an air flow for the rear of the vehicle compartment. A rear duct section 78 surrounds the opening 76 to guide the air down to the lower surface of the assembly where a rear duct (not shown) may be attached.

Holes 80 in the housing section walls receive the pivot pins 50', 62' and 64' of the doors 50, 62 and 64 respectively, so that the pins are journaled in the holes 80. The door 50 is partitioned into two flaps 82, each secured to the pin 50' and arranged to cover an aperture 48a or 48b when the door is in one position with a gap between the flaps to accommodate the vertical run of the baffle 40. The flaps 82 each are shaped to close the respective channel when the door 50 is swung into the other position.

Figure 5:
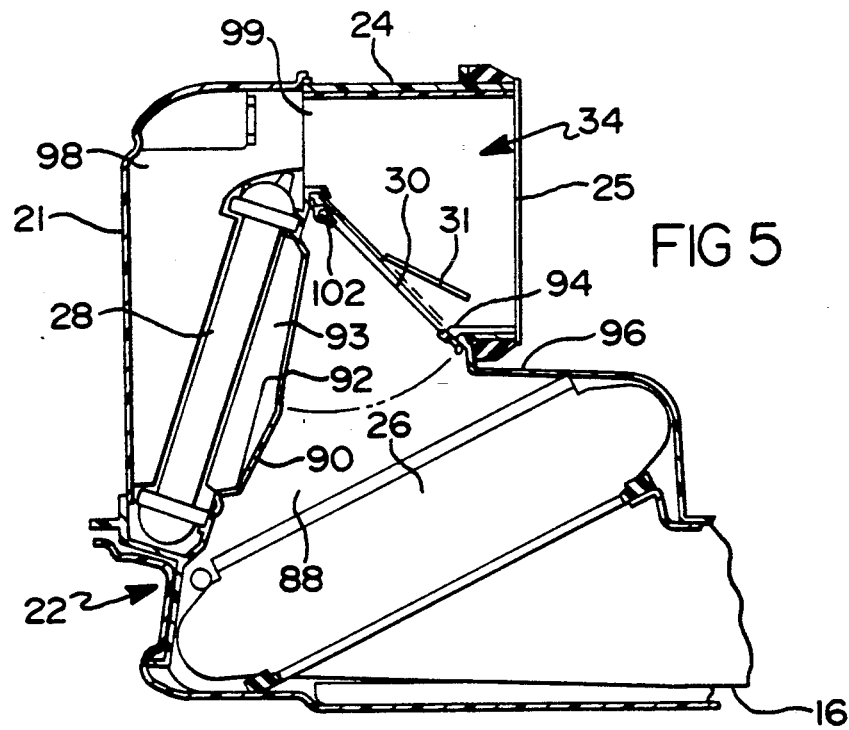
FIG. 5 is a cross-sectional view of the heat exchanger assembly and temperature control door arrangement of the system according to the invention.

FIG. 5 is a plan view section through the heat exchanger assembly 22 and the outlet housing. The evaporator 26 is positioned at an angle in the end of the blower housing 16 and the heater core 28 has a first end adjacent an end of the evaporator and the core is angled away from the evaporator so that the second end of the core is spaced from the evaporator and a V-shaped space 88 is defined between the two heat exchangers. A wall 90 between the evaporator and the first end of the heater core extends into the space 88 and defines a pair of vertically spaced door openings 92 which admit air flow from the evaporator 26 to the heater core 28. A narrow baffle 93 molded with the wall 90 is positioned between the doors and extends to the upstream side of the heater core 28 to serve as a first portion of the baffle 34. A second pair of door openings 32a, 32b are formed between the second end of the heater core 28 and a housing portion 96 adjacent both the evaporator and the mouth of the outlet housing 24. The doors 30 are pivoted by a pin 102 near the second end of the core 28 to close the openings 92 or 94 or to assume any intermediate position. A web 98 molded as part of the heater cover 21 serves as a second portion of the baffle 34 and extends from the downstream side of the heater core 28 to the mating line of the heater cover 21 and the outlet housing 24. A separator insert 99 extending from the downstream edge of the web 98 to the mouth 25 of the outlet housing serves as the third portion of the baffle 34 which maintains the air passing through the openings 92 and 94 in separate channels. Thus the baffle 34 comprises three parts 93, 98 and 99, lying in the same plane to divide the air flow into separate channels. When the doors 30 are in an intermediate position the cold air from the evaporator 26 flowing through each door 32a, 32b mixes in the respective channels with heated air from the core to realize an intermediate air temperature. Angled deflectors 31 attached to each door direct the cold air into the heated air in a manner to facilitate mixing.

Figure 6:
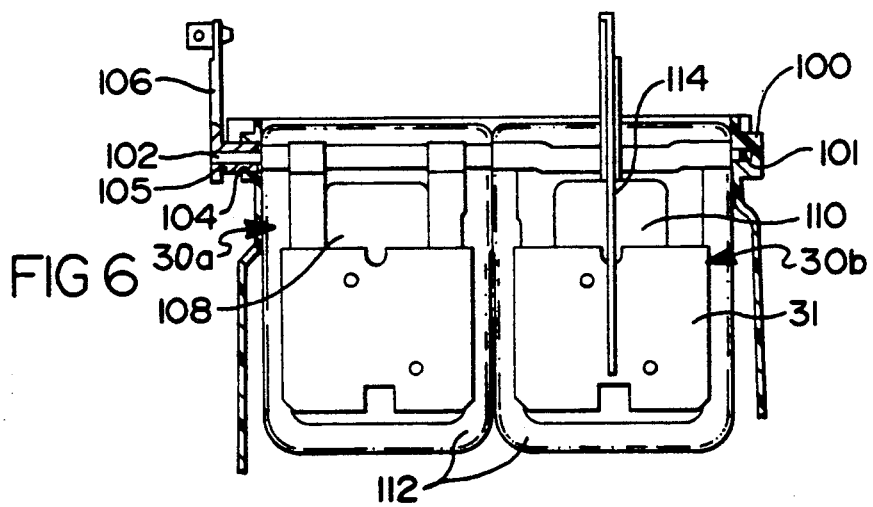
FIGS. 6 and 7 are views of dual and single temperature control doors, respectively, according to the invention.

The doors 30a and 30b used for dual zone control are shown in FIG. 6. The outlet housing 24 is shown in cross section and includes a boss 100 with a recess 101 for receiving a pivot pin 102 on one side of the housing and an aperture 104 for receiving the pin 102 on the opposite side of the housing. The pin 102 is a steel shaft having one end journaled in the recess 101 and having the other end fixed in the hub 105 of an actuating lever 106 for controlling the rotational position of the pin, the hub 105 being journaled in the aperture 104. The doors 30a and 30b comprise two rigid door panels 108 and 110, respectively, each fitted with a soft rubber peripheral flange 112 for sealing contact with the openings 32a, 32b, 92, and 94. The door panel 108 of door 30a is secured to the pin nearest the end carrying the lever 106 and is fixed to the pin for rotation therewith so the door 30a position depends on the lever position. One end of the door panel 110 is provided with plain bearings which are journaled on the pin 102 nearest the boss 100 so that the door 30b can freely pivot on the pin and its position is not controlled by the lever 106. An actuating arm 114 on the panel 110 and extending into the lower duct 36b is the means for positioning the door 30b.

Figure 7:
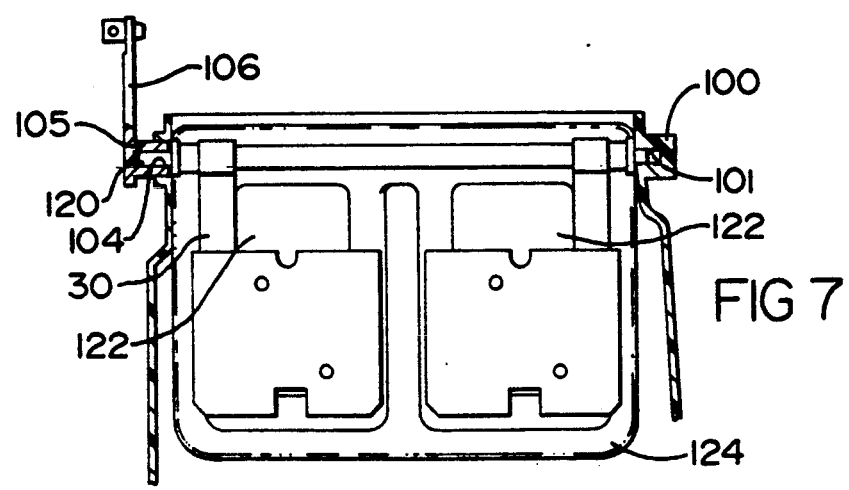

The door 30 used for single zone control is shown in FIG. 7. The housing is the same as shown in FIG. 6 and has the boss 100 and the aperture 104. The hinge pin 120 of the door is rotatably mounted in the boss opening 101 and the aperture 104. The pin 120 supports two rigid panels 122 spaced from one another. The panels are fitted with a peripheral rubber flange 124 which bridges the space between the panels 122. The panels 122 are fixed to the pin 120 for rotation therewith so that the door is movable with the pin, which is positioned by a lever 106 and the actuator 33a, not shown in FIG. 6. The rubber flange affords the flexibility around the periphery as well as between the panels 122 for a sealing cooperation with the door openings. The single door 30 is thus fully interchangeable with the combination of dual doors 30a and 30b. At the time of manufacture the door 30 and actuator 33a are chosen to build a single zone system and doors 30a and 30b and actuators 33a and 33b are chosen to build a dual zone system.

In operation, with the dual zone system the doors 30a and 30b are independently controlled to determine the temperature in each of the channels 36a and 36b. Channel 36a supplies the passenger side of the vehicle compartment (assuming the driver sits to the left of the passenger) and all the discharge vents 46a, 48a, and 52a on the passenger side will have air temperature determined by the position of the door 30a. At the same time the vents 46b, 48b and 52b on the driver side will have air temperature determined by the position of the door 30b which is independent of the door 30a. With the single zone system, the two channels maintain separate air streams just as the dual system does but the single door 30 controls both air streams to the same temperature.

The duct design for two channels and the dual door arrangement was effected in the same space envelope previously used for a conventional single zone system, in spite of the drawback that the temperature door, the upper mode doors and the lower mode doors have mutually perpendicular pivot axes. Only one tooling design is used for the molded housing and the mode doors since they are the same for single and dual zones. Each of the mode doors, which are moved together by a single actuator, could be mounted for independent movement by individual actuators to lend further flexibility in control for each channel. For example, the passenger may direct air of any temperature through the lower vent while the driver directs air at another temperature through a defogger vent. Using the same scheme of dividing the duct into parallel channels, more than two channels can be created. With two separating baffles, three channels are provided, each with its own set of temperature and mode doors. The third channel would be used for the rear compartment and controlled separately for the rear. Similarly, three separator baffles would divide the duct into four channels, each with independent controls. Then the rear compartment could be provided with two separately controlled channels.

The embodiments of the invention in which an exclusive property or privilege is claimed are defined as follows:

1. A method of assembling a heating and air conditioning system in a vehicle having a compartment including a driver side and a passenger side, comprising the steps of:
   providing heat exchanger means;
   providing duct means for carrying conditioned air from the heat exchanger means to first discharge vents serving the passenger side and to second discharge vents serving the driver side;
   providing a baffle in the duct means and extending from the heat exchanger means throughout the duct means to divide the duct means into first and second channels serving the first and second discharge vents respectively;
   providing mixer door mounting means having a pivot axis extending across the first and second channels; and
   installing either one of a first and second exchangeable mixer door means wherein:
   the first mixer door means has a pivot pin journaled in the mounting means and a door across both channels fixed to the pivot pin for movement about the pivot axis to control the air flow to each channel to substantially the same temperature; and
   the second mixer door means has a pivot pin journaled in the mounting means and a door in each channel mounted on the pivot pin for independent movement about the pivot axis to control the temperature of the air flow to each channel independently.

2. The invention as defined in claim 1 including the further steps of:
   providing a single actuator coupled to the pivot pin when the first mixer door means is installed wherein the actuator is coupled to the pivot pin to position the door; and
   providing two actuators separately coupled to the doors when the second mixer door means is installed.

3. The invention as defined in claim 1 wherein for the second door mixer means the door in one channel is fixed to the pivot pin and the door in the other channel is journaled to the pivot pin.

4. The invention as defined in claim 1 wherein for the second door mixer means the door in one channel is fixed to the pivot pin and an actuator connected to the pivot pin controls the door position, and the door in the other channel is journaled to the pivot pin and is controlled by an actuator connected directly to the door.

5. A method of assembling a vehicle heating and air conditioning system comprising:
   providing an outlet duct including a plurality of air outlets;
   providing an intake duct for supplying an air flow the outlet duct;
   providing heat exchanger means in the intake duct for selectively heating and cooling the air flow to the outlet duct;
   providing baffle means in the inlet and outlet ducts for dividing the ducts into a plurality of channels, each channel for carrying a portion of the air flow to at least one outlet; and providing door means cooperatively arranged with the heat exchanger means for controlling the temperature of the air flow in the channels including selecting door means from a) a single door and an actuator for positioning the door to simultaneously control the air flow to each channel to substantially the same temperature, and b) a separate door and an actuator for each channel to independently control the temperature of the air flow to each channel, the single door and separate doors being interchangeable.

* * * * *